(12) United States Patent
Teichmann

(10) Patent No.: US 7,524,096 B2
(45) Date of Patent: Apr. 28, 2009

(54) MULTISECTIONAL BUILDING ELEMENT WITH CONNECTION SEAM AND METHOD TO MANUFACTURE SAME

(75) Inventor: Volker Teichmann, Amstetten (DE)

(73) Assignee: odelo GmbH, Schwaikheim (DE)

( * ) Notice: Subject to any disclaimer, the term of this patent is extended or adjusted under 35 U.S.C. 154(b) by 152 days.

(21) Appl. No.: 11/505,723

(22) Filed: Aug. 17, 2006

(65) Prior Publication Data

US 2007/0041205 A1 Feb. 22, 2007

(30) Foreign Application Priority Data

Aug. 17, 2005 (DE) .................. 10 2005 040 225

(51) Int. Cl.
*F21V 5/00* (2006.01)

(52) U.S. Cl. .................. 362/520; 362/267; 362/307; 362/327; 362/343

(58) Field of Classification Search ......... 362/520–522, 362/307, 308, 327, 343, 267
See application file for complete search history.

(56) References Cited

U.S. PATENT DOCUMENTS 7,287,877 B2 * 10/2007 Yasuda et al. ............... 362/267

FOREIGN PATENT DOCUMENTS

| DE | 10230277 A1 | 1/2004 |
|---|---|---|
| DE | 10333606 A1 | 3/2005 |
| DE | 102005004637 A1 | 10/2005 |
| EP | 1191280 A1 | 3/2002 |

* cited by examiner

*Primary Examiner*—Stephen F Husar
(74) *Attorney, Agent, or Firm*—Reising Ethington P.C.

(57) ABSTRACT

A component assembly includes a first part having a transparent section. The first part defines an outer surface. A second part is fixedly secured to the first part at a portion of the transparent section. The first and second parts create a connecting seam through the portion of the transparent section. An optically covering surface extends between the connecting seam and the outer surface of the first part to cover the connecting seam from view from the outer surface.

9 Claims, 1 Drawing Sheet

MULTISECTIONAL BUILDING ELEMENT WITH CONNECTION SEAM AND METHOD TO MANUFACTURE SAME

BACKGROUND ART

1. Field of the Invention

The invention relates to a multipart component having a connecting seam. More particularly, the invention relates to the multipart component for a lighting unit and a method for manufacturing same.

2. Description of the Related Art

For multipart components having a connecting seam between a transparent first part and a second part, a known problem is that the connecting seam can be seen by an observer. If the transparent part represents a visible side of the component in accordance with requirements, the connecting seam is often objectionable and detracts from the overall appearance of the component.

For lighting units of motor vehicles, which represent an example of such multipart components, such a connecting seam between an external lamp, i.e., light diffuser, and the reflector part is particularly objectionable in the lighting unit, since the high-quality appearance of the lighting unit is impaired by a non-uniform connecting seam in the field of vision of the observer. This is particularly unacceptable when the lighting unit is a part of an expensive product such as a motor vehicle. The circumferential connecting seam is located in the edge region of the lighting unit. To laminate the connecting seam, a matching strip-like cover made of a covering material, a plastic layer, for example, is therefore applied to the exterior of the transparent cover. This is laborious, and this cover may be damaged after the lighting unit or vehicle has been used for some time.

SUMMARY OF THE INVENTION

A component assembly includes a first part having a transparent section. The first part defines an outer surface. A second part is fixedly secured to the first part at a portion of the transparent section. The first and second parts create a connecting seam through the portion of the transparent section. An optically covering surface extends between the connecting seam and the outer surface of the first part to cover the connecting seam from view from the outer surface.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
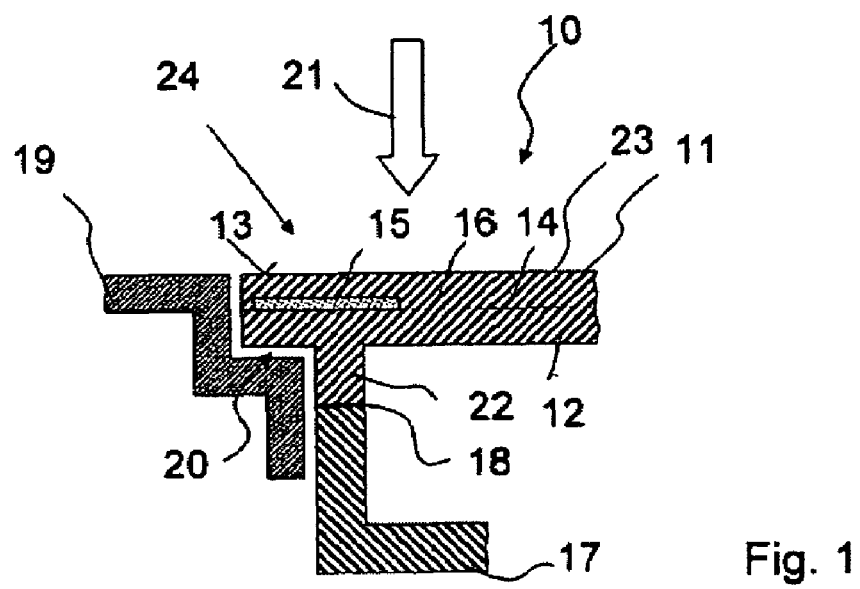
FIG. 1 is a cross-sectional side view of one embodiment of the invention incorporated into a component having a connecting seam.

In the Figures, elements that basically remain the same or have the same function are designated by identical reference numerals. FIG. 1 schematically illustrates a multipart component 10 having a connecting seam 18 between a transparent first part 11 and a second part 17. With its outer surface 13, the transparent first part 11 forms a visible side 23 in accordance with specified requirements of the multipart component 10. The connecting seam 18 is located in a region 24 that is visible through the outer surface 13. The transparent first part 11 has a projection 22 at which the connecting seam 18 is situated on the outer end face side.

In a multipart component according to the invention, an optically covering surface 23 is provided between a connecting seam 18, situated between a transparent section of the first part 11 and a second part 17, and an outer surface 13 of the transparent part 11 (the first part 11), which covers, at least in places, the connecting seam 18 from a visible side 23 of the multipart component 10. Without the covering surface 15, the connecting seam 18 would be visible from the outside. The optically covering surface 15 is located inside the transparent first part 11, and thus in a manner of speaking is encapsulated by the body thereof and is completely protected from external influences that could act on the first part 11 from the outside. The optically covering surface 15 is inserted into the transparent first part 11 during the manufacturing process, so that laborious refinishing of the final installed component is omitted. The term "optically covering" need not necessarily mean complete opaqueness, provided that direct visibility of the connecting seam 18 is at least significantly reduced. Optionally, in a similar manner the second part may also be provided with an optically covering surface 15. This is advantageous when the second part 17 of the multipart component 10 also has a transparent design at one or more possible seam locations and is to form a visible side, which in accordance with requirements, is accessible to a possible observer, for example, a case that is at least partially transparent. The first 11 and second 17 parts preferably represent constituents of a housing for the component 10. Other parts of the component may also be provided with such an optically covering surface.

The transparent first part 11 is formed from a first partial region 12 facing the connecting seam 18 and a second partial region 14 facing the outer surface 13, the partial regions 12, 14 abutting one another at an interface 16. The interface 16 must not be noticeable. For a component 10 designed as an injection-molded part, the interface 16 disappears after the second partial region 14 is attached.

An optically covering surface 15 is provided between the connecting seam 18 and the outer surface 13 which covers, at least in places, the connecting seam 18 from the visible side 23. The component 10 is adjacent to, for example, a body 19 such as a wall of a mounting opening, and overlaps same on the edge side at an overlap region 20.

The optically covering surface 15 is provided between the first and second partial regions 12, 14, and preferably is designed as a vapor deposition layer. The surface 15 may have an opaque or also a semitransparent design. The surface 15 covers the connecting seam 18 in the direction of sight 21. In the embodiment, the surface 15 is so wide that it also partially covers the overlap region 20 of the component 10 with the body 19.

According to the invention, for the multipart component 10, the first partial region 12 is formed, the optically covering surface 15 is provided there in places, and then the second partial region 14 is provided which encapsulates the surface 15. The optically covering surface 15 may be applied to the first partial region 12 using the PVD and/or CVD method, or by other suitable methods such as spraying, placement, imprinting, in particular pad printing, or stamping, in particular hot stamping.

Figure 2:
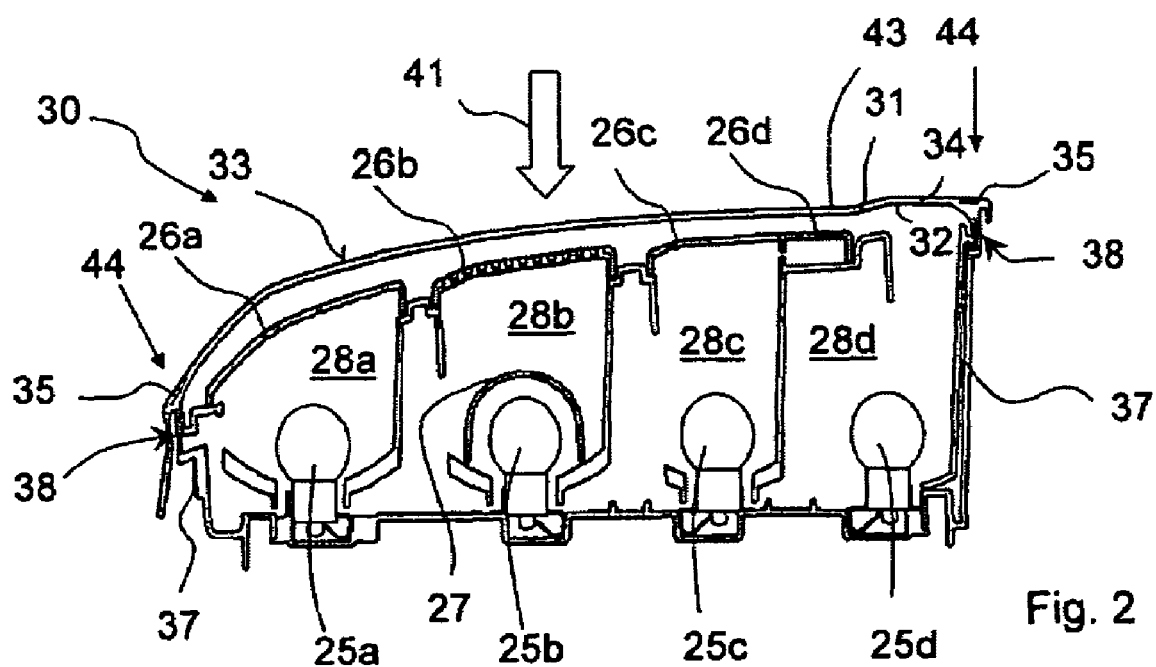
FIG. 2 is a cross-sectional side view of the invention incorporated into an automotive lighting unit.

FIG. 2 shows a preferred lighting unit 30 as an example of a multipart component. The lighting unit 30 represents a vehicle lighting unit. A transparent first part 31 is designed as a light diffuser having an outer side 33, and covers a second part 37 comprising a series of reflector regions 28a, 28b, 28c, 28d having associated light sources 25a, 25b, 25c, 25d. The light diffuser represents a typical visible side 43 of the lighting unit 30. The reflector regions 28a, 28b, 28c, 28d are sealed off with respect to the transparent first part 31 by elements 26a, 26b, 26c, 26d, which influence the light emitted from the light sources 25a, 25b, 25c, 25d in a desired manner known as such. The transparent first part 31 preferably is formed from polymethylmethacrylate (PMMA) or polymethylmethacrylimide (PMMI).

A connecting seam 38 is provided between the transparent first part 31 and the second part 37. In the installed state, the second part 37 is usually located inside a vehicle body and is not visible from the outside, whereas the transparent first part 37 is located on a visible side 34 of the lighting unit 30. In the direction of sight 41 on the edge side, an optically covering surface 35 is provided on the first part 31 circumferential to a visible region 44, between a first partial region 32 facing the connecting seam 38 and a second, outwardly facing partial region 34 of the first transparent part. It is seen that in this case, the optically covering surface 35 has a very unobtrusive and narrow design to cover the unattractive connecting seam 38, typically a weld seam. In the direction of sight 41, the connecting seam 38 in each case is covered in a region 44, visible in principle to an observer, by means of the optically covering surface 35.

In the manufacture of the lighting unit 30, the transparent first part 31 designed as a light diffuser may be produced as an injection-molded part in an injection mold, whereby initially the first partial region 32 is injection-molded by introducing PMMA or PMMI, for example, into the injection mold. A preform is then formed which is removed from the injection mold. The optically covering surface 35 is then applied to the first partial region 32, in particular by vapor deposition or sputtering. If the optically covering surface 35 is produced by such PVD or CVD methods, the areas of the partial region 32 not to be coated are masked by covering with an appropriate shadow mask, or a mask is applied in the form of a photomask, known from photolithography, which is removed after coating with the optically covering surface 35. After reinsertion into the injection mold the first partial region 32 is insert molded and/or overmolded, thereby forming the second partial region 34. The transparent first part 31, which at this point is completely formed, is then securely joined to the second part 37 at the connecting seam 38. If the second part 37 is made of plastic, the first and second parts 31, 37 may be welded together, in particular by friction welding.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

The invention claimed is:

1. A component assembly comprising:
   a first part having a transparent section and defining an outer surface;
   a second part fixedly secured to said first part at a portion of said transparent section, said first and second parts creating a connecting seam through said portion of said transparent section; and
   an optically covering surface extending between said connecting seam and said outer surface of said first part to cover said connecting seam from view from said outer surface.

2. A component assembly as set forth in claim 1 wherein said first part is formed from a first partial region and a second partial region.

3. A component assembly as set forth in claim 2 wherein said optically covering surface is disposed between said first and second partial regions.

4. A component assembly as set forth in claim 3 wherein said optically covering surface includes a vapor deposition layer.

5. A component assembly as set forth in claim 3 wherein said optically covering surface includes an insert.

6. A component assembly as set forth in claim 3 wherein said first partial region faces said connecting seam.

7. A component assembly as set forth in claim 6 wherein said second partial region faces said outer surface.

8. A component assembly as set forth in claim 7 wherein said optically covering surface includes a color pigment.

9. A vehicular lighting assembly
   a diffusion lens having a transparent section defining an outer surface;
   a reflective housing fixedly secured to said diffusion lens along a portion of said transparent section, said diffusion lens and said reflective housing creating a connecting seam through said portion of said transparent section; and
   an optically covering surface extending between said connecting seam and said outer surface to cover said connecting seam from view from said outer surface.

* * * * *